(12) United States Patent
Su

(10) Patent No.: US 7,136,046 B2
(45) Date of Patent: Nov. 14, 2006

(54) STRUCTURE OF HOUSING FOR WIRELESS MOUSE

(75) Inventor: Chih Wen Su, Taipei (TW)

(73) Assignee: Behavior Tech Computer Corp., Taipei (TW)

( * ) Notice: Subject to any disclaimer, the term of this patent is extended or adjusted under 35 U.S.C. 154(b) by 485 days.

(21) Appl. No.: 10/775,502

(22) Filed: Feb. 9, 2004

(65) Prior Publication Data
US 2005/0012719 A1    Jan. 20, 2005

(30) Foreign Application Priority Data
Jul. 18, 2003    (TW) .............................. 92213156 U

(51) Int. Cl.
*G06G 5/08*    (2006.01)
(52) U.S. Cl. ...................... 345/163; 345/167
(58) Field of Classification Search ................ 345/163, 345/164–167; 463/37; D14/402
See application file for complete search history.

(56) References Cited

U.S. PATENT DOCUMENTS 6,225,981 B1 *   5/2001   Lu .............................. 345/164
6,411,281 B1 *   6/2002   Sasselli et al. .............. 345/163
2005/0012718 A1* 1/2005   Lin ............................. 345/163

* cited by examiner

*Primary Examiner*—Jimmy H. Nguyen
(74) *Attorney, Agent, or Firm*—Rosenberg, Klein & Lee

(57) ABSTRACT

The structure of a housing for a wireless mouse comprises an upper cover, a lower cover and a battery lid, wherein the upper cover has a battery-receiving chamber; it is characterized by that: a slide block is received in a slide-block receiving chamber in the lower cover, and has a first and a second trapezoidal block, a pusher rod and an elastic-element receiving portion. An elastic element is received in the elastic-element receiving portion to make the slide block slide to a position effecting tight engagement of the battery lid with the lower cover. A first rib having an engaging hook is provided in the battery lid, it is used to make engagement of the engaging hook with the first trapezoidal block when the battery lid is engaged with the lower cover, thereby the battery lid is tightly engaged with the lower cover. And a second rib is provided in the battery lid, it is used to move the second trapezoidal block when the pusher rod is moved to separate the battery lid from the lower cover.

10 Claims, 7 Drawing Sheets

STRUCTURE OF HOUSING FOR WIRELESS MOUSE

FIELD OF THE INVENTION

The present invention is related to a structure of a housing for a wireless mouse, and especially to the structure formed by press connecting of a battery lid with a lower cover of a wireless mouse.

BACKGROUND OF THE INVENTION

A U.S. Pat. No. 6,411,281B1 titled "MOUSE WITH BATTERY COMPARTMENT ON TOP" disclosed a mouse having a top cover and a lower housing engaged and connected with each other by means of a latch. In the mouse structure of the U.S. Pat. No. 6,411,281B1, if the latch is subjected to an external force at the engaging area, such as subjected to an impacting external force when the mouse inadvertently drops to the ground, the latch will be subjected to a down pressing force to make loose and get rid of a ledge of the top cover and is released from the ledge of the top cover, thereby the top cover is separated from the lower housing, and this is the defect of U.S. Pat. No. 6,411,281B1.

In view of the above defect to be solved pressingly of the prior art, the inventor of the present invention provides a structure formed by press connecting of a battery lid with a lower cover of a wireless mouse to solve the problem resided in the prior art.

SUMMARY OF THE INVENTION

The object of the present invention is to provide a structure formed by press connecting of a battery lid with a lower cover of a wireless mouse; the battery lid and the lower cover are tightly engaged with each other, so that the battery lid can be protected from releasing from the lower cover even when the wireless mouse inadvertently drops to the ground.

Therefore, in order to get the abovementioned object, the present invention provides a structure of a housing for a wireless mouse, the structure comprises an upper cover, a lower cover and a battery lid, wherein the upper cover has a battery-receiving chamber. The structure is characterized by that: a slide block is received in a slide-block receiving chamber in the lower cover, and has a first trapezoidal block, a second trapezoidal block, a pusher rod and an elastic-element receiving portion. An elastic element is received in the elastic-element receiving portion to make the slide block slide to a position effecting tight engagement of the battery lid with the lower cover. A first rib having an engaging hook is provided in the battery lid, it is used to make engagement of the engaging hook with the first trapezoidal block when the battery lid is engaged with the lower cover, thereby the battery lid is tightly engaged with the lower cover. And a second rib is provided in the battery lid, it is used to push to move the second trapezoidal block when the pusher rod is moved to make separation of the battery lid from the lower cover.

The present invention will be apparent in its object, features and functions after reading the detailed description of the preferred embodiment thereof in reference to the accompanying drawings.

DETAILED DESCRIPTION OF THE INVENTION

Figure 1:
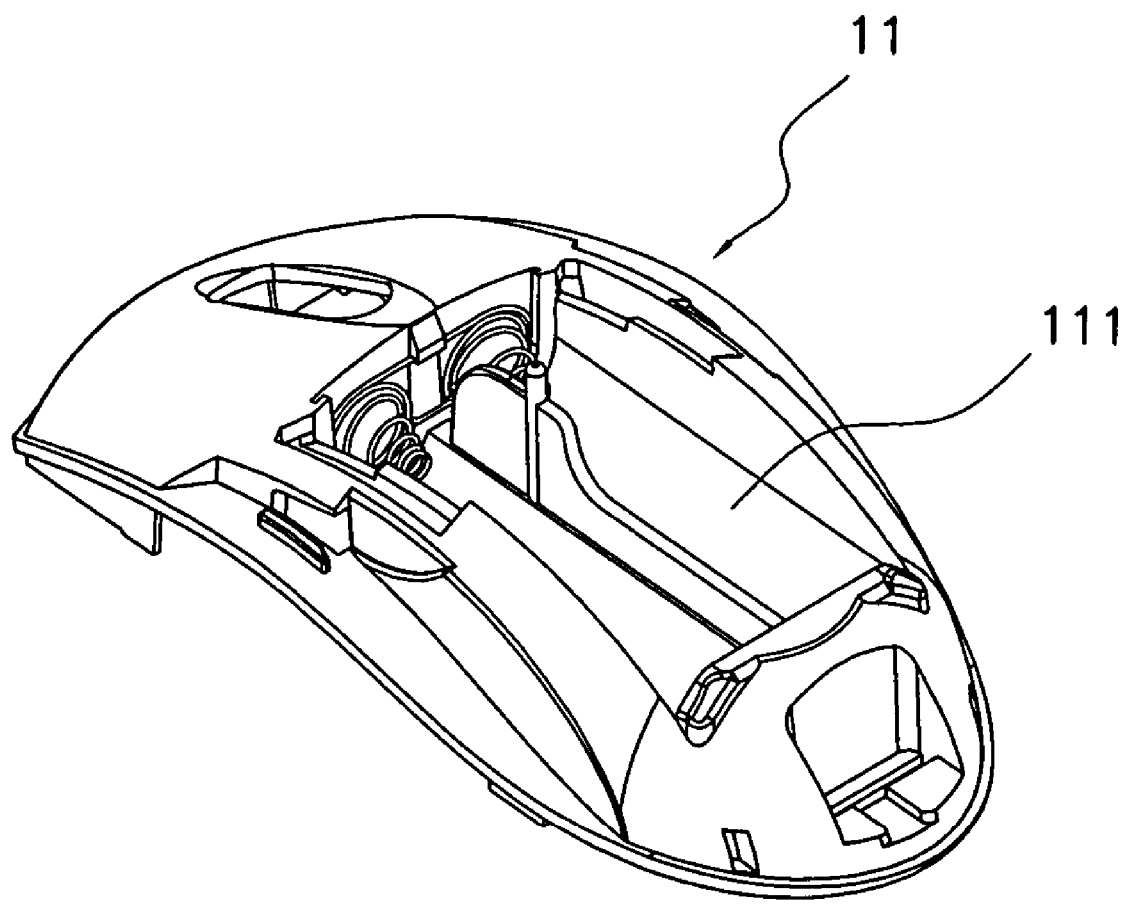
FIG. 1 is a perspective view showing the structure of an upper cover of a housing for a wireless mouse of the present invention.
Figure 2:
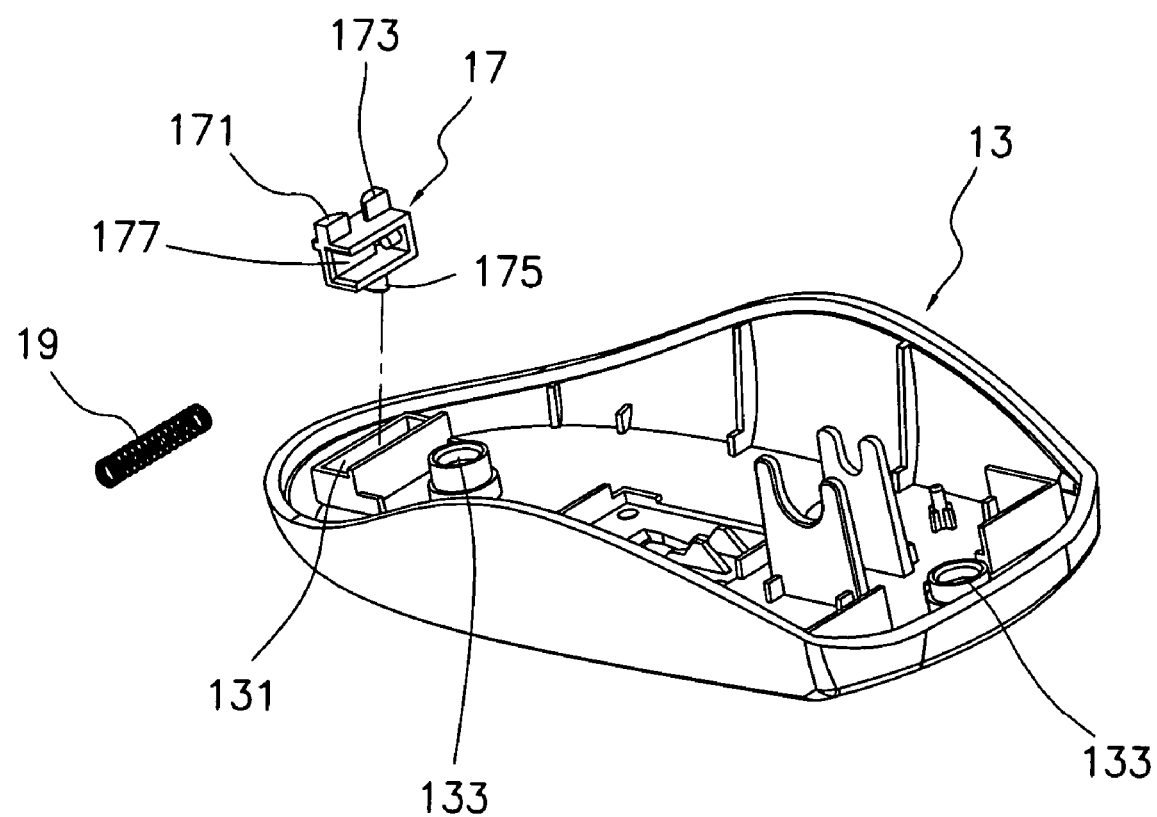
FIG. 2 is a perspective view showing the structure of a lower cover with a slide block and an elastic element of the housing for the wireless mouse of the present invention.
Figure 3:
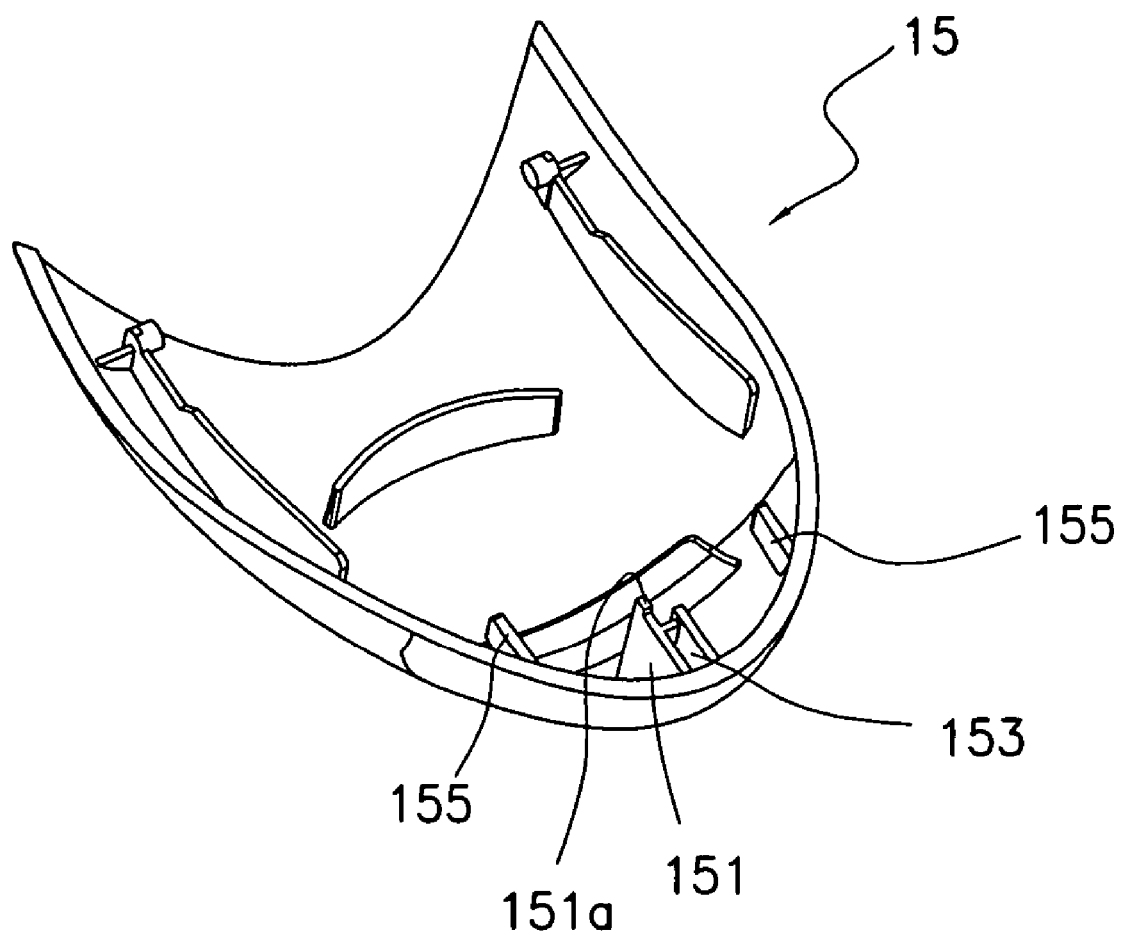
FIG. 3 is a perspective bottom view of a battery lid of the housing for the wireless mouse of the present invention.

FIG. 1 shows the structure of an upper cover of a housing for a wireless mouse of the present invention, FIG. 2 shows the structure of a lower cover with a slide block and an elastic element of the housing for the wireless mouse of the present invention, while FIG. 3 shows a battery lid of the housing for the wireless mouse of the present invention. The housing of the wireless mouse of the present invention mainly comprises an upper cover 11, a lower cover 13, a battery lid 15, a slide-block 17 and an elastic element 19, wherein the upper cover 11 has a battery-receiving chamber 111 for placing therein batteries. The slide block 17 is received in a slide-block receiving chamber 131 in the lower cover 13, and has a first trapezoidal block 171, a second trapezoidal block 173, a pusher rod 175 and an elastic-element receiving portion 177.

Figure 4:
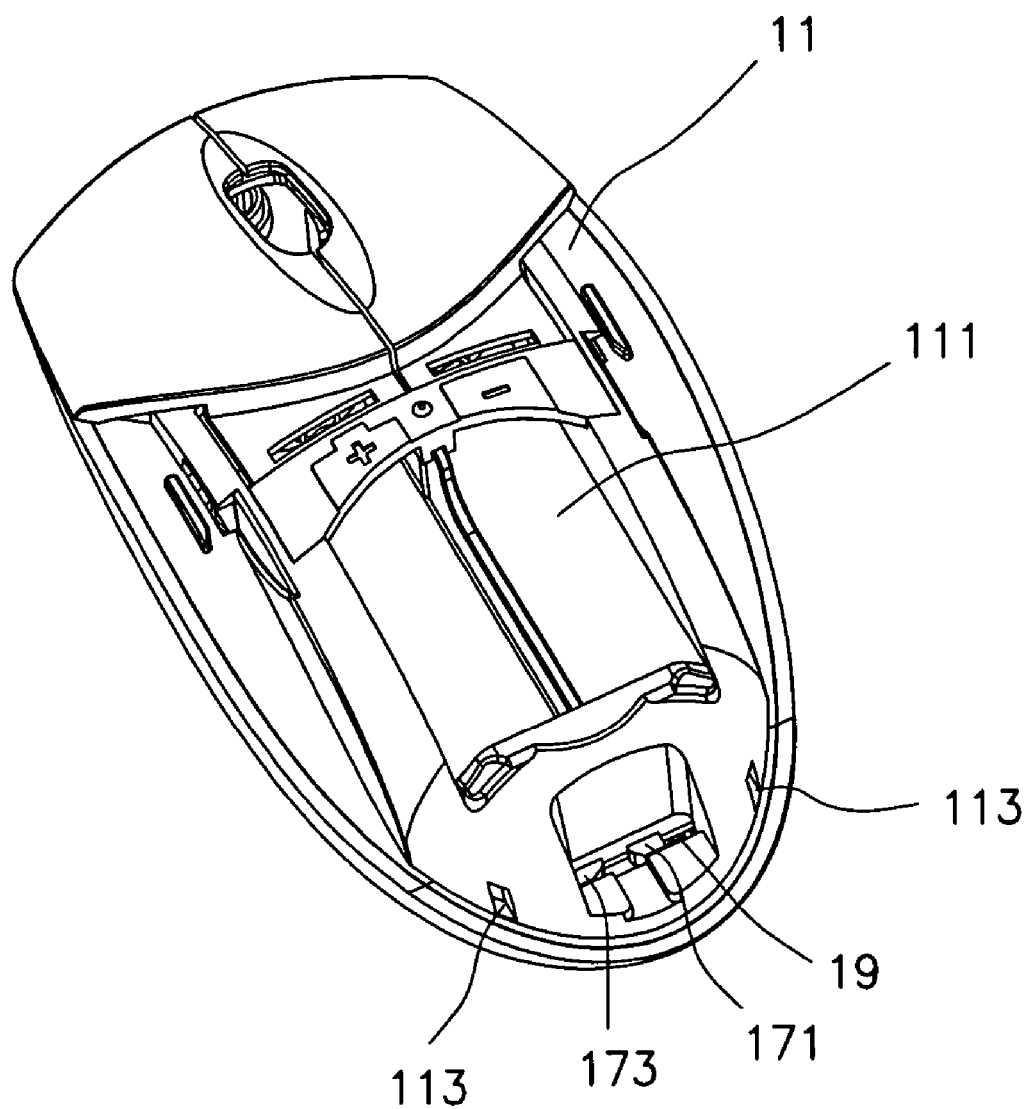
FIG. 4 is a perspective top view of the present invention after assembling.
Figure 5:
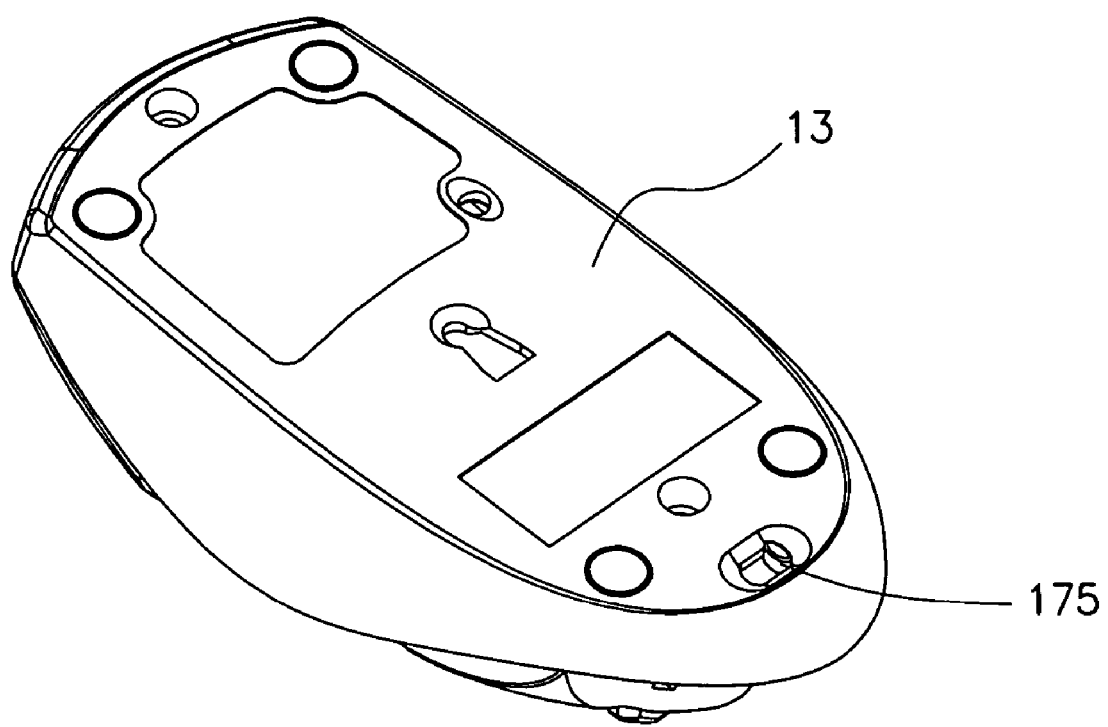
FIG. 5 is a perspective bottom view of the present invention after assembling.

FIG. 4 is a perspective top view of the present invention after assembling;

FIG. 5 is a perspective bottom view of the present invention after assembling. In assembling the housing of the wireless mouse of the present invention, the elastic element 19 is received in the elastic-element receiving portion 177 of the slide block 17, then the slide block 17 is placed in the slide-block receiving chamber 131 of the lower cover 13, and the upper cover 11 is screw connected using screws (not shown) with screw holes 133 provided on the lower cover 13. When the batteries are placed in the battery-receiving chamber 111 of the upper cover 11, the battery lid 15 is taken to cover and engage the lower cover 13.

Figure 6:
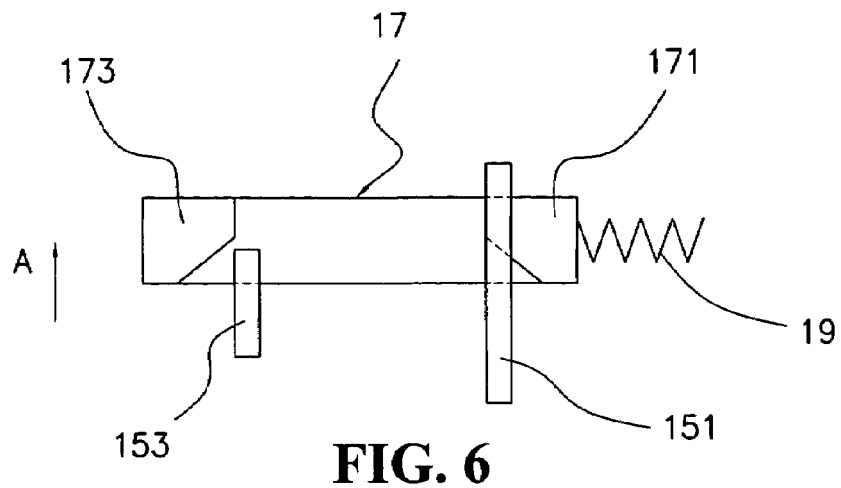
FIG. 6 is a schematic view structurally showing engagement of the battery lid with the slide block of the present invention.

FIG. 6 structurally shows engagement of the battery lid 15 with the slide block 17 of the present invention, wherein the elastic element 19 of the present invention mainly is used to slide the slide block 17 to a position effecting tight engagement of the battery lid 15 with the lower cover 13. A first rib 151 which is provided in the battery lid 15 has an engaging hook 151a, when the lower cover 13 is engaged with the battery lid 15 along a first direction "A", the engaging hook 151a is engaged with a first trapezoidal block 171 of the slide block 17, and by the function of the elastic element 19, the slide block 17 keeps to the position effecting tight engagement of the battery lid 15 with the lower cover 13, so that the battery lid 15 is tightly engaged with the lower cover 13.

Figure 7A:
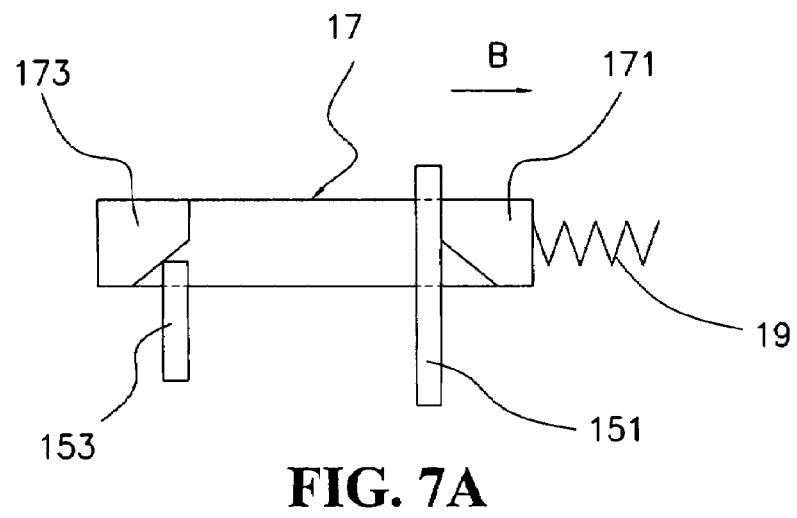
FIGS. 7A and 7B are schematic views structurally showing separation of the battery lid from the slide block of the present invention.
Figure 7B:
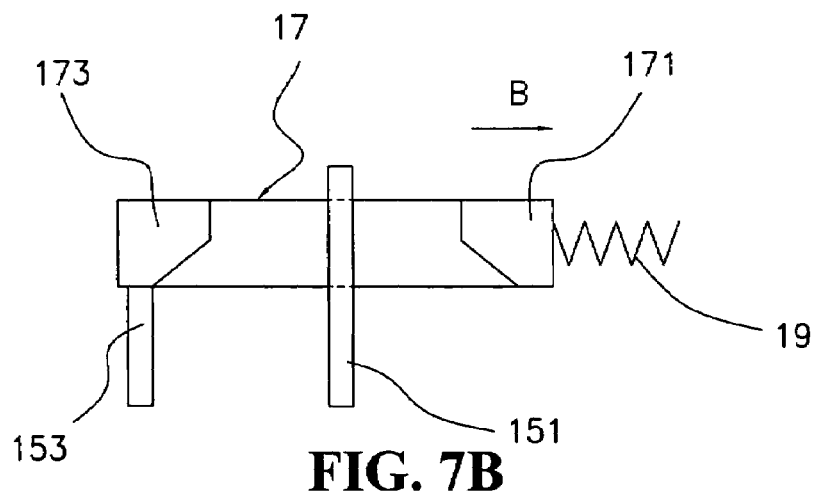

FIGS. 7A and 7B structurally show separation of the battery lid 15 from the slide block 17 of the present invention, wherein the battery lid 15 has a second rib 153 of which the main function is to push to move the second trapezoidal block 173 when the pusher rod 175 is moved along a second direction "B" to make separation of the battery lid 15 from the lower cover 13.

The elastic element 19 in the embodiment of the present invention can be a spring. The relationship of length between the first rib 151 and the second rib 153 in this embodiment can be that: the length of the first rib 151 is slightly larger than that of the second rib 153.

Figure 8:
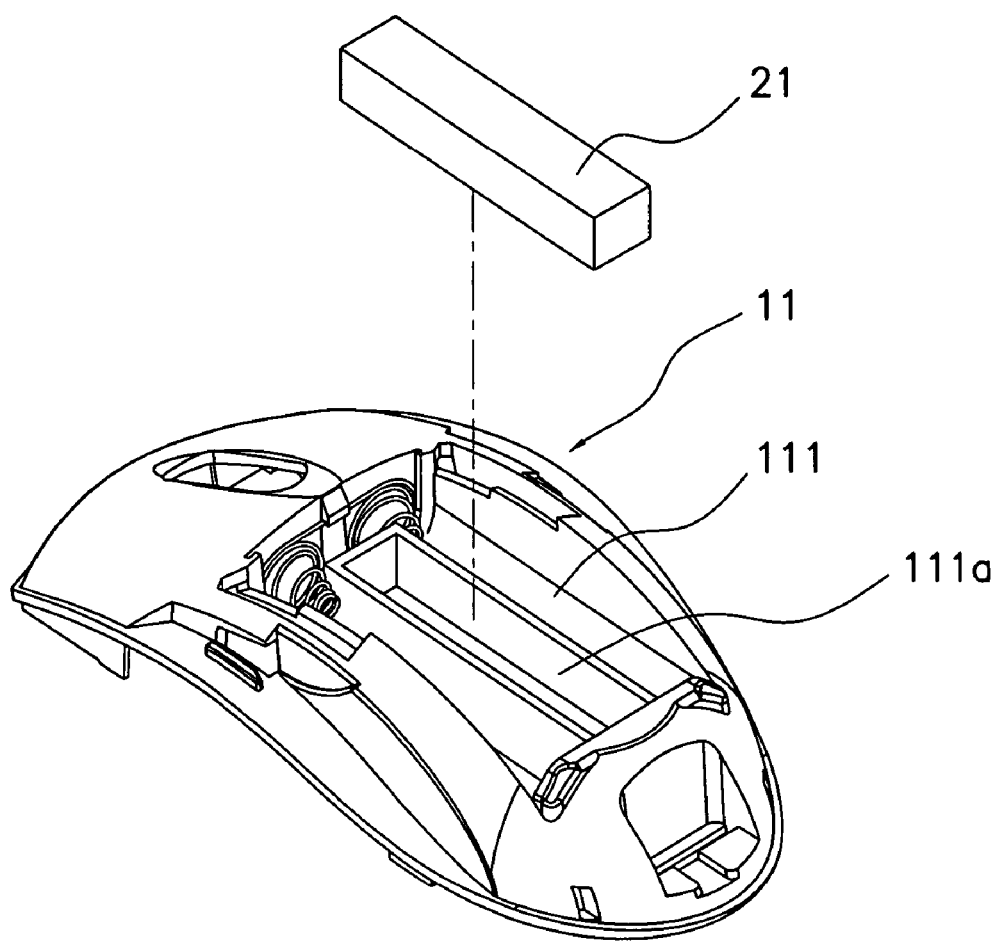
FIG. 8 is a perspective view structurally showing a battery-receiving chamber being further provided therein with a receiving chamber for a wireless receiver of the present invention.

FIG. 8 structurally shows the battery-receiving chamber 111 being further provided therein with another receiving chamber for a wireless receiver of the present invention. The battery-receiving chamber 111 of the present invention mainly is used to receive the batteries which provide electric power for the wireless mouse of the present invention. By virtue that the battery lid 15 and the lower cover 13 are not subjected to separating by an impacting force created when the mouse inadvertently drops to the ground or in some other case, hence the present invention is further provided in the space within the battery-receiving chamber 111 with another receiving chamber 111a to receive a pen-type electronic device 21; particularly, the pen-type electronic device 21 can be a wireless receiver or a pen drive used for the wireless mouse, or can be a wireless receiver/pen drive unit having both functions of a wireless receiver and a pen drive, or even be some other electronic device with a pen-type structure etc.

The upper cover 11 of the present invention is further provided with a plurality of positioning holes 113, and the battery lid 15 is further provided with a plurality of positioning ribs 155 respectively corresponding to the positioning holes 113; so that when the battery lid 15 is engaged with the lower cover 13, the positioning ribs 155 extend into their corresponding positioning holes 113 to strengthen the tight connection of the battery lid 15 with the lower cover 13.

And by virtue that the present invention has the lower cover 13 engaged tightly with the battery lid 15 along the first direction "A", while only allows the lower cover 13 to separate from the battery lid 15 along the second direction "B" which is different from the first direction "A" (in the preferred embodiment of the present invention, the first direction "A" is perpendicular to the second direction "B"); thereby the battery lid 15 of the wireless mouse of the present invention will never be separated from the wireless mouse when the wireless mouse is suffered from an impact in the first direction "A" such as by inadvertent dropping to the ground.

It will be apparent to those skilled in this art that various equivalent modifications or changes can be made to the elements of the present invention without departing from the spirit and conception of this invention. Accordingly, all such equivalent modifications and changes shall fall within the scope of the appended claims.

What is claimed is:

1. A structure of a housing for a wireless mouse, said structure comprises an upper cover, a lower cover and a battery lid, wherein said upper cover has a battery-receiving chamber; said structure is characterized by that:
   a slide block is received in a slide-block receiving chamber in said lower cover, and has a first trapezoidal block, a second trapezoidal block, a pusher rod and an elastic-element receiving portion;
   an elastic element is received in said elastic-element receiving portion to make said slide block slide to a position effecting tight engagement of said battery lid with said lower cover;
   a first rib having an engaging hook is provided in said battery lid, and is used to make engagement of said engaging hook with said first trapezoidal block when said battery lid is engaged with said lower cover, thereby said battery lid is tightly engaged with said lower cover; and
   a second rib is provided in said battery lid, and is used to push to move said second trapezoidal block when said pusher rod is moved to make separation of said battery lid from said lower cover.

2. The structure of a housing for a wireless mouse as in claim 1, wherein said elastic element is a spring.

3. The structure of a housing for a wireless mouse as in claim 1, wherein length of said first rib is slightly larger than that of said second rib.

4. The structure of a housing for a wireless mouse as in claim 1, wherein said first rib is used to make engagement of said engaging hook with said first trapezoidal block when said battery lid is engaged with said lower cover along a first direction, and wherein said second rib is used to push to move said second trapezoidal block when said pusher rod is moved to make separation of said battery lid from said lower cover along a second direction, and said first direction is perpendicular to said second direction.

5. The structure of a housing for a wireless mouse as in claim 1, wherein said upper cover is further provided with a plurality of positioning holes, and said battery lid is further provided with a plurality of positioning ribs respectively corresponding to said positioning holes.

6. The structure of a housing for a wireless mouse as in claim 1, wherein said battery-receiving chamber is further provided therein with another receiving chamber to receive a pen-type electronic device.

7. The structure of a housing for a wireless mouse as in claim 6, wherein said pen-type electronic device is a wireless receiver.

8. The structure of a housing for a wireless mouse as in claim 6, wherein said pen-type electronic device is a pen drive.

9. The structure of a housing for a wireless mouse as in claim 6, wherein said pen-type electronic device is a wireless receiver/pen drive unit.

10. The structure of a housing for a wireless mouse as in claim 6, wherein said pen-type electronic device is an electronic device with a pen-type structure.

* * * * *